July 28, 1959          J. C. FISHER, JR          2,897,102
OXIDATION RESISTANT GRAPHITE AND METHOD FOR MAKING THE SAME
Filed July 1, 1957
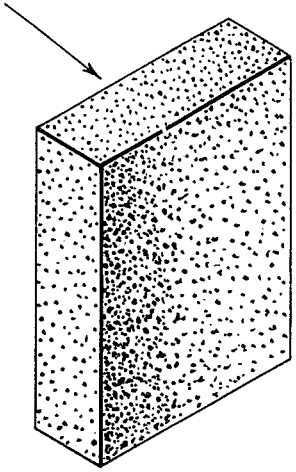
Impregnated with Colloidal Silica
and Phosphoric Acid
*INVENTOR.*
JOSEPH C. FISHER, JR.
BY
*ATTORNEY*

2,897,102

Patented July 28, 1959

2,897,102

OXIDATION RESISTANT GRAPHITE AND METHOD FOR MAKING THE SAME

Joseph C. Fisher, Jr., Berea, Ohio, assignor to Union Carbide Corporation, a corporation of New York Application July 1, 1957, Serial No. 668,932

9 Claims. (Cl. 117—169)

This invention relates to oxidation resistant refractory graphite articles, and to a method for producing the same.

The various utilization of phosphoric acid as a low temperature oxidation retardant for graphite over the ranges of 400° C. to 850° C. is amply described in the prior art. Graphite so treated, however, does not remain oxidation resistant for as long a time as particular applications thereof require, as the effectiveness of the acid gradually disappears with the evaporation of phosphorus pentoxide from the graphitic surfaces. This loss of oxidation resistance is naturally aggravated at temperatures much in excess of 800° C.

It is thus the primary object of this invention to overcome the foregoing and related disadvantages by providing means for the retention of phosphoric acid in graphitic bodies for longer periods and at higher temperatures than heretofore possible.

It is a further object to provide graphite articles having improved oxidation resistance at temperatures much in excess of 800° C.

It is another object of this invention to provide methods for the production of such articles.

The attainment of these objects is based upon the discovery that the useful life of phosphoric acid as an oxidation retardant can be extended by reacting it in situ with colloidal silica to form a silicon-phosphorous-oxygen complex (example, silico phosphate) in the pores of graphite articles. This is accomplished by introducing a colloidal silica solution or a polymeric form of silicic acid into the graphite structure by impregnation; soaking or brushing and drying the so treated article prior to the conventional phosphoric acid impregnation. It has further been found that for best results the molar ratio $SiO_2:H_3PO_4$ must be within 1:0.2 and 1:3.7. While the method may be performed sequentially, a further embodiment thereof contemplates the impregnation of a graphitic body with a single solution containing silica and phosphoric acid in a mole ratio range of 1:0.7 to 1:15 at a pH of less than 6. The single drawing accompanying the instant description is a perspective view of a graphite block impregnated with the impregnants of this invention.

As an example of the practice of the invention, an aqueous colloidal solution containing 30 percent of silica was introduced in a suitable pressure vessel that had been evacuated to about 10 mm. of mercury, and in which had been placed previously graphite blocks having an average permeability of 70 millidarcys and a flexural strength of about 2800 p.s.i. At the end of this time the treated pieces were dried at 100° C.–150° C. for 16–24 hours. The dried graphite was then replaced in a pressure vessel maintained at atmospheric pressure and impregnated with 30 percent phosphoric acid until the graphite had picked up between 1 percent and 6 percent thereof calculated on the basis of $H_3PO_4$. The thus impregnated graphite was then heated at 150° C. until dryness.

Table I following indicates comparative results of oxidation tests in the case of untreated graphite phosphoric acid-treated graphite and graphite treated according to the method of the invention, respectively.

TABLE I

*Oxidation loss of graphite, various temperatures*

| Sample | Untreated | $H_3PO_4$ treatment | Colloidal silica plus $H_3PO_4$ treatment |
|---|---|---|---|
| Temp., ° C | 650 | 650 | 650 |
| Time, hours | 25 | 25 | 25 |
| Loss mg./cm.² | 470 | 100 | 50 |
| Temp., ° C | 750 | 750 | 750 |
| Time, hours | 10 | 10 | 10 |
| Loss, mg./cm.² | 230 | 165 | 85 |
| Temp., ° C | 850 | 850 | 850 |
| Time, hours | 8 | 8 | 8 |
| Loss, mg./cm.² | 390 | 325 | 190 |

On heating to the oxidizing test temperature of 650° C., the phosphoric acid treated graphite undergoes a rapid weight loss. During this initial period much phosphorus pentoxide fumes are evolved. The silico-phosphate treated graphite has a low initial weight loss and only traces of $P_2O_5$ fumes are evolved upon heating. Table II following shows the increase in flexural strength obtainable by the method of this invention. By contrast with control and phosphoric acid treated stock, this strength remains high under oxidizing conditions.

TABLE II

*Flexural strength of oxidized graphite measured at room temperature*

| Sample (treatment) | Temp., ° C. | Time, hours | Flexural strength, psi | Temp., ° C. | Time, hours | Flexural strength, psi |
|---|---|---|---|---|---|---|
| Control (untreated) | | | 2,420 | | | 3,100 |
| Control (untreated) | 650 | 10 | 1,310 | 750 | 5 | 2,020 |
| $H_3PO_4$ impregnated | 650 | 10 | 1,350 | 750 | 5 | 1,430 |
| Colloidal silica impregnated | | | 2,830 | | | |
| Colloidal silica and $H_3PO_4$ impregnation | 650 | 10 | 3,200 | 750 | 5 | 2,870 |

While this invention has been described with particular reference to the treatment of graphite blocks, the invention is not limited thereto, but rather its method is equally applicable to many other articles ordinarily produced from graphite, as long as such articles do not contain more than 0.5 percent of iron.

Presently most graphite extruded stock is made from a type of coke known as "puffing" coke. Generally where the formed articles must have a diameter in excess of 3 inches, iron oxide is incorporated in the green carbon mix as an anti-puffer. This material should be removed or at least not more than 0.5 percent of iron should be present in articles treated in accord with the invention.

From the foregoing it is apparent that the objects of the invention have been attained, and that there has been provided graphite articles which are more resistant to the action of oxidizing conditions and which have greater durability than those produced by prior art methods.

This application is a continuation-in-part of my copending application Serial No. 482,671, filed January 18, 1955, now abandoned.

What is claimed is:

1. A method for improving the oxidation resistance of graphite articles containing not more than 0.5 percent iron, which method comprises introducing in solution form into the pores of said articles, phosphoric acid and colloidal silica, said phosphoric acid having a tendency to disappear at the temperatures to which said articles are exposed in normal use thereby becoming ineffective for its purpose, said silica serving to react with said phosphoric acid to form a silicon phosphorus oxygen complex at such temperatures, thus inhibiting loss of said phosphoric acid from said articles.

2. A method for improving the oxidation resistance of graphite articles containing not more than 0.5 percent iron, which method comprises introducing in solution form into the pores of said articles, a mixture of phosphoric acid and colloidal silica, said phosphoric acid having a tendency to disappear at the temperatures to which said articles are exposed in normal use thereby becoming ineffective for its purpose, said silica serving to react with said phosphoric acid to form a silico-phosphorus oxygen complex at such temperatures, thus inhibiting loss of said acid from said articles.

3. The method of claim 2 wherein the molar ratio of the amount of silica-phosphoric acid lies within the ranges of 1:0.2 and 1:3.7.

4. A method for improving the oxidation resistance of graphite articles containing not more than 0.5 percent iron, which method comprises sequentially impregnating said articles at reduced and increased pressures with an aqueous colloidal silica solution, drying the treated article at about 100° C., impregnating the dried article with phosphoric acid solution, and drying the article, said phosphoric acid having a tendency to disappear at the temperatures to which said articles are exposed in normal use, thereby becoming ineffective for its purpose, said silica serving to react with said phosphoric acid to form a silicon phosphorus oxygen complex at such temperatures, thus inhibiting loss of said phosphoric acid from said articles.

5. The method of claim 4, wherein the concentrations of said colloidal silica solution and said phosphoric acid solution are 30 percent.

6. A graphite article which in its normal use is intended for exposure to oxidizing conditions at elevated temperatures upwards of 400° C., the deleterious oxidation of said article being prevented by the presence in the pores thereof of the reaction product of between 1 and 6 percent of silicon dioxide and 1 and 6 percent of phosphoric acid.

7. An article according to claim 6, wherein the molar ratio of silicon dioxide to phosphoric acid lies between the limits of 1 to 0.2 and 1 to 3.7, said reaction product being in the form of a silicon-phosphorus-oxygen complex.

8. The method of claim 2 wherein the graphite article is impregnated with colloidal silica and phosphoric acid by soaking in a solution mixture of the same.

9. The method according to claim 2 wherein the solution mixture of phosphoric acid in colloidal silica is brushed on to the graphite article.

References Cited in the file of this patent

UNITED STATES PATENTS

| | | |
|---|---|---|
| 1,991,487 | Bemis | Feb. 19, 1935 |
| 2,570,750 | Bauer | Oct. 9, 1951 |
| 2,685,539 | Woddbrun et al. | Aug. 3, 1954 |